United States Patent
Lu

(10) Patent No.: US 11,907,438 B2
(45) Date of Patent: Feb. 20, 2024

(54) ELECTRONIC LABEL TYPE KEYBOARD

(71) Applicant: Ying-Zhang Lu, New Taipei (TW)

(72) Inventor: Ying-Zhang Lu, New Taipei (TW)

(*) Notice: Subject to any disclaimer, the term of this patent is extended or adjusted under 35 U.S.C. 154(b) by 0 days.

(21) Appl. No.: 17/988,144

(22) Filed: Nov. 16, 2022

(65) Prior Publication Data

US 2023/0152904 A1 May 18, 2023

(30) Foreign Application Priority Data

Nov. 16, 2021 (TW) ................................ 110142651

(51) Int. Cl.
*G06F 3/02* (2006.01)

(52) U.S. Cl.
CPC ............................... *G06F 3/0219* (2013.01)

(58) Field of Classification Search
CPC ........................ G06F 3/0219; G06F 3/0238
See application file for complete search history.

(56) References Cited

U.S. PATENT DOCUMENTS

| 2008/0001787 | A1* | 1/2008 | Smith | H01H 13/88 341/23 |
| 2013/0342467 | A1* | 12/2013 | Cresp | G06F 3/0238 345/172 |
| 2019/0042048 | A1* | 2/2019 | Chandrasekhara | G06F 1/1654 |

FOREIGN PATENT DOCUMENTS

| CN | 104951088 A | * | 9/2015 |
| KR | 20170056846 A | * | 5/2017 |
| TW | 200840212 A | | 10/2008 |
| TW | 201508620 A | * | 3/2015 |
| TW | 201508620 A | | 3/2015 |

OTHER PUBLICATIONS

Official Action issued by Taiwan Intellectual Property Office dated Nov. 17, 2022.

* cited by examiner

*Primary Examiner* — Temesghen Ghebretinsae
*Assistant Examiner* — Karin Kiyabu
(74) *Attorney, Agent, or Firm* — Chun-Ming Shih; LANWAY IPR SERVICES

(57) ABSTRACT

An electronic label keyboard includes a display unit disposed on each content area of a keyswitch, a microprocessor, an input module and an output module. The input module receives and reads at least one keyswitch content file provided by an external device, when the microprocessor is activated from a shutdown mode or a hibernate mode, it reads the file analysis software to analyze a keyswitch label content file and outputs a plurality of the keyswitch display signals, so that the output module controls the plurality of display units according to the plurality of keyswitch display signals to output label contents corresponding to the plurality of keyswitch display signals.

8 Claims, 7 Drawing Sheets

ELECTRONIC LABEL TYPE KEYBOARD

CROSS-REFERENCE TO RELATED APPLICATIONS

This application claims the priority of Republic of China Patent Application No. 110142651 filed on Nov. 16, 2021, in the State Intellectual Property Office of the R.O.C., the disclosure of which is incorporated herein by reference.

BACKGROUND OF THE INVENTION

Field of the Invention

The invention relates to an electronic label keyboard provided with a display unit at the content area of each keyboard keyswitch to achieve the customization of key indication content.

Descriptions of the Related Art

Commercial tablets can be operated via handwriting or touch screen inputs, and provided the advantage of portability by eliminating the need of a physical keyboard. However, a physical keyboard is still the smoothest and most precise way to operate computers for the general public.

A common keyboard has approximately 100 keyswitchs, and has different keyswitch combinations depending on the region. The label contents on the keyboard are not possible to change after the manufacturing process. Most English keyboards do not have ZhuYin or CangJie symbols printed on the keyboards for Traditional Chinese users in Taiwan, which causes great inconveniences for consumers in Taiwan. Users often need to purchase extra stickers to glue on the keyswitchs on the keyboard. However, this solution not only consumes time, but also causes damage to the appearance or cleanliness of the keyswitchs when gluing. Additionally, because some users in Taiwan may only use the ZhuYin system during Chinese typing, the CangJie symbols on the keyboard appear to be superfluous.

In addition, some users often set up hotkeys or shortcut keys for their commonly used software, many gaming keyboards go so far as coloring different function keys. Therefore, users may have to purchase multiple keyboards to fit different conditions because the current keyboards cannot flexible to automatically be switched between different keyswitch label contents.

Based on the above-mentioned problems, there is a topic that is of urgently concerned to those skilled in the art is to provide a computer keyboard, which provides key labeling content in different situations for different usage needs, so as to increase operable convenience and flexibility of keyboard operation.

SUMMARY OF THE INVENTION

Given the shortcomings of the above-mentioned prior art, the present invention provides an electronic label keyboard, wired or wireless connected to an external device, comprising: a plurality of keyswitchs, each of the plurality of keyswitch has a content area respectively; a plurality of display units, respectively disposed on the content areas of the keyswitchs, at least one of the plurality of display units outputting according to a keyswitch display signal, so that the keyswitch located on the at least one display unit displays a marked content; and a keyswitch display content setting unit, including: a microprocessor having a storage module for saving file parsing software; a keyswitch content input module for receiving and reading at least one keyswitch content file provided by the external device, and saving the at least one keyswitch content file in the storage module of the microprocessor; and a keyswitch content output module, when the microprocessor is activated from a shutdown mode or a hibernate mode, the microprocessor reads the file analysis software to analyze a keyswitch label content file saved in the storage module and outputs a plurality of the keyswitch display signals, so that the keyswitch content output module controls the plurality of display units according to the plurality of keyswitch display signals to output label contents corresponding to the plurality of keyswitch display signals.

Preferably, the electronic label keyboard said above, the storage module of the electronic label keyboard saves a file list having a plurality of keyswitch label content file and a list reading software. The plurality of keyswitches have a plurality of file selecting keyswitches and a setting keyswitch. When the setting keyswitch is triggered, the microprocessor reads the list reading software saved in the storage module to output a plurality of file selecting signals according to the file list, and allows the keyswitch content output module to control the display unit disposed on the content area of each of the plurality of file selecting keyswitches according to the plurality of file selecting signals to output the keyswitch display content setting names corresponding to each of the plurality of file selection signals. The display content setting name is set for the user to view and conveniently select the keyswitch label content for setting. After the user selects and triggers a file selecting keyswitch of the plurality of file selecting keyswitch, the microprocessor reads the file parsing software saved in the storage module to output the plurality of keyswitch display signals corresponding to a default keyswitch label content file according to the selected file selecting keyswitch, so as to make the keyswitch content output module control the plural display units according to the plural keyswitch display signals to output the display content corresponding to the keyswitch display signals.

Preferably, the electronic label keyboard said above, the external device is a computer host, the computer host has a detecting software, so that when the user executes different operating systems on the computer host to switch the display of the computer host to different pages, the label contents of the plurality of keyswitches are further switched accordingly. In detail, the detecting software identifies the operating system executed by the computer host to identify the identification information of the operating system in execution, and inputs the identification information through the keyswitch content input module of the electronic label keyboard. The microprocessor reads the file parsing software saved in the storage module to select the default keyswitch label content file corresponding to the identification information, and the file parsing software outputs a plurality of the keyswitch display signals according to the default keyswitch label content file corresponding to the identification information, so that the keyswitch content output module controls the plurality of display units to output the label content corresponding to the keyswitch display signal according to the plurality of the keyswitch display signals, so as to achieve the switching processing of the label content displayed by the plurality of keyswitches.

Preferably, the electronic label keyboard said above, the external device is a computer host, the electronic label keyboard further includes a signal splitter connected with each of the plurality of keyswitches and the microprocessor and with the computer host. One of the plurality of keyswitches has a switch keyswitch, and the switch keyswitch is used for the user to input a keyswitch display content switch signal. After the signal splitter receives the keyswitch display content switch signal, the microprocessor reads and parses the keyswitch label content file corresponding to the keyswitch display content switch signal saved in the storage module to output a plurality of keyswitch display signals, so that, the keyswitch content output module controls the plurality of display units to output the label content corresponding to the keyswitch display content switch signal according to the plurality of keyswitch display signals. On the other hand, the signal splitter notifies the computer host to execute the corresponding keyswitch display content switching process according to the keyswitch display content switch signal.

In view of the above-mentioned shortcomings of conventional art, the present invention provides an electronic label keyboard, the original input signal and label content of each keyswitch on the keyboard can be changed according to the user's needs, that is, the user can set the input signal to the desired keyswitch position on the keyboard according to the desired input signal to be operated. Further, the keyswitch set with the input signal will display the symbol mark represented by the input signal for the user to find or hint. Therefore, the present invention can provide a customized keyboard.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The electronic label keyboard of the present invention can change the display content of the keyboard keyswitches according to user requirements, that is, it provides a customized keyswitch display content, so as to solve the limitation of the single display content in the existing keyboard such as Chinese keyboard, the British keyboard or the American keyboard.

Figure 1:
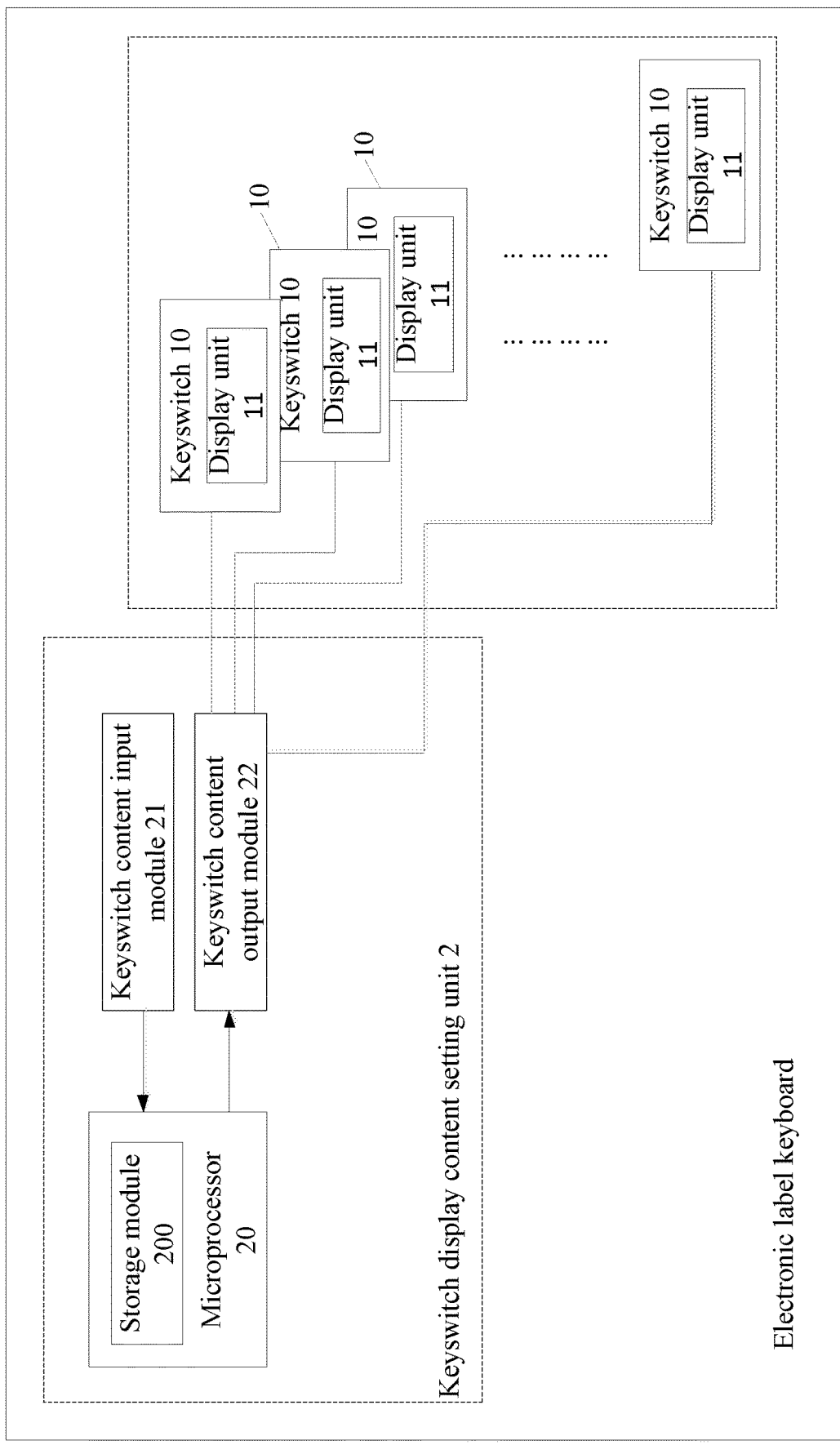
FIG. 1 is a block diagram of the basic system structure of the electronic label keyboard of the first embodiment of the present invention.

Firstly, referring to FIG. 1, an embodiment of the electronic label keyboard includes: a plurality of keyswitches 10, a plurality of display units 11 and keyswitch display content setting unit 2. Each of the plurality of display units 11 is respectively disposed below each keyswitch 10, and at least one display unit of the plurality of display units 11 outputs a keyswitch display signal, so that the keyswitch 10 on the at least one display unit 10 can display a label content. It is worth mentioning that according to durability or market considerations, except the display unit 11 can be arranged below the keyswitch 10, the display unit 11 can also be set in the transparent keyswitch made of transparent material. In other words, each of the plurality of keyswitch 10 has a content area respectively, so that the plurality of display units 11 are respectively arranged in the content area of each of the keyswitch 10. Therefore, any configuration structure that allows the display unit 11 to provide the keyswitch 10 to output the label content can be applied. Due to the connection structure and configuration between the keyswitch 10 and the display unit 11 can be achieved by conventional techniques, that is, the electrical signal input processing generated by the triggering of the keyboard keyswitch can be processed by the conventional method, and will not be reiterated herein. The display unit 11 of the embodiment can be E-paper, LCD, Mini LED or Micro LED.

The keyswitch display content setting unit 2 includes a microprocessor 20, a keyswitch content input module 21, and a keyswitch content output module 22. The microprocessor 20 has a storage module 200 for saving file parsing software. The keyswitch content input module 21 is used for connecting with an external device (not shown here) in a wired or wireless manner to receive and read at least one keyswitch label content file provided by the external device, and save the at least one keyswitch label content file in the storage module 200 of the microprocessor 20. The keyswitch content input module 21 can be a USB interface, a PS/2 interface, or a wired connection interface of a memory slot, or the keyswitch content input module 21 may be a wireless connection interface using Bluetooth communication. The keyswitch content input module receives the keyswitch label content file provided by the external device through the wireless connection interface or the wired connection interface. When the microprocessor 20 is activated from a shutdown mode or a hibernate mode, the microprocessor 20 reads the file analysis software to analyze a keyswitch label content file saved in the storage module 200 and outputs a plurality of the keyswitch display signals, so that the keyswitch content output module 22 controls the plurality of display units 11 according to the plurality of keyswitch display signals to output label contents corresponding to the plurality of keyswitch display signals. For example, when there are dozens of keyswitches on the keyboard, and the user only needs the keyswitches of four directions, up, down, left and right, the electronic label keyboard of the present invention can be applied to allow the keyswitches that only display the label content of four directions, up, down, left, and right, and the display units of the rest keyswitch will not display any label content. Therefore, the present invention can succinctly display the keyswitch symbols that the user desired to use, so that the user can quickly find the keyswitch on the keyboard and make the input operation smoother.

In the above-mentioned embodiment, the plurality of keyswitches 10 further provided with an activation keyswitch (not shown in the figure). After the the activation keyswitch is clicked by the user, the microprocessor 20 is activated from a shutdown mode or a hibernate mode, the microprocessor 20 reads the file analysis software to analyze a keyswitch label content file saved in the storage module 200 and outputs a plurality of the keyswitch display signals, so that the keyswitch content output module 22 controls the plurality of display units 11 according to the plurality of keyswitch display signals to output label contents corresponding to the plurality of keyswitch display signals.

Further, the above-mentioned external device can be a computer host, moreover, can be an electronic device that can provide users with keyboard input, such as a mobile phone or a TV with the function of connecting to the Internet. The electronic label keyboard of the present invention reads and saves the keyswitch label content file provided by the external device, not only as the display content of the keyswitches, but also as the communication interface between the electronic label keyboard of the present invention and different external devices.

Figure 2:
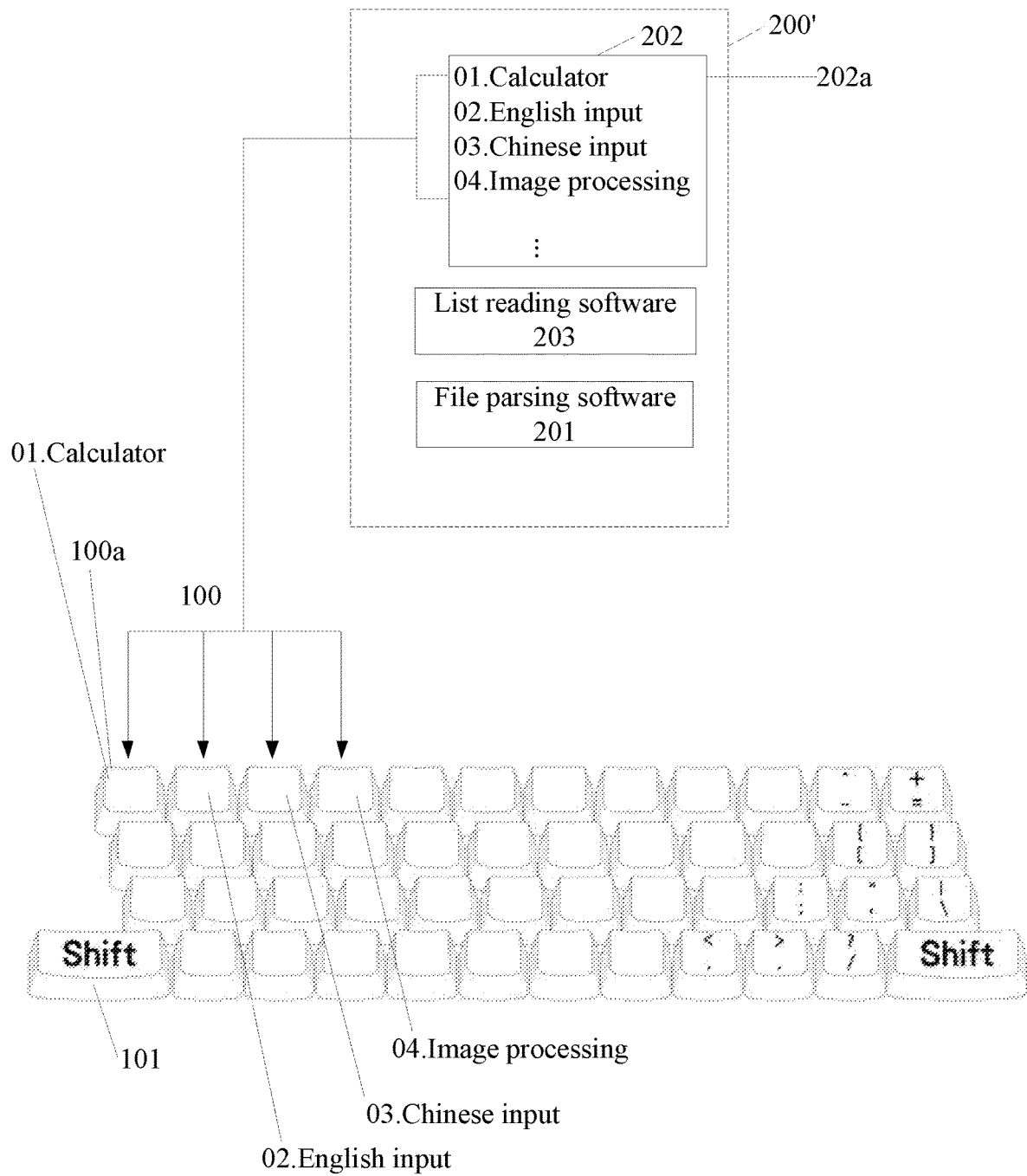
FIG. 2 is a schematic view of the keyswitch display content and the content saved in the storage module of the second embodiment of the electronic label keyboard of the present invention.
Figure 3:
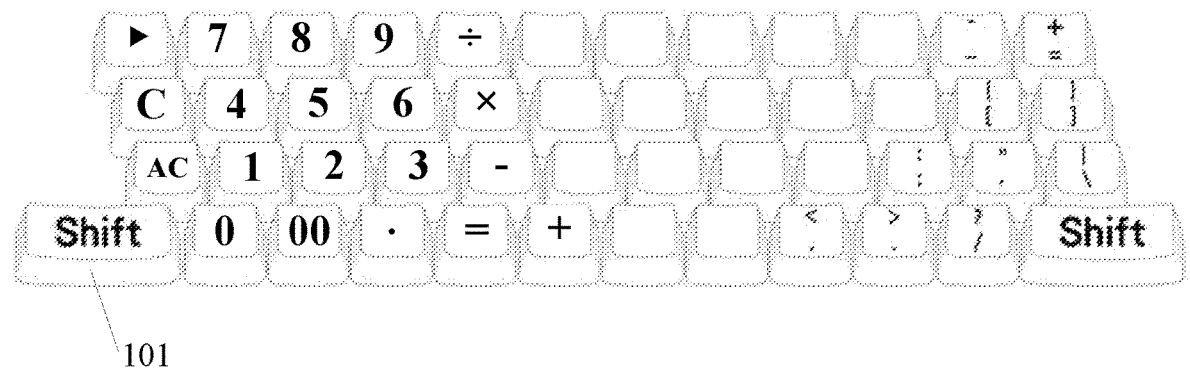
FIG. 3 is an example of the label content displayed by each keyswitch after selecting the file selecting keyswitch with "Calculator" of the electronic label keyboard as shown in FIG. 2.

Further, referring to FIG. 2, in addition to saving the file parsing software 201, the storage module 200' of the electronic label keyboard of the embodiment also saves a file list 202 having a plurality of keyswitch label content file and a list reading software 203. The plurality of keyswitches have a plurality of file selecting keyswitches 100 and a setting keyswitch 101. When the setting keyswitch 101 is triggered, the microprocessor reads the list reading software 203 saved in the storage module 200' to output a plurality of file selecting signals according to the file list 202, and allows the keyswitch content output module to control the display unit disposed on the content area of each of the plurality of file selecting keyswitches 100 according to the plurality of file selecting signals to output the keyswitch display content setting names corresponding to each of the plurality of file selection signals. The display content setting name of this embodiment is set for the user to view and conveniently select the keyswitch label content for setting, for example, the file name of the keyswitch label content file, that is, as shown in FIG. 2, the present embodiment provides the four keyswitch label content files "Calculator", "English input", "Chinese input" and "Image processing" as an example for illustration, but is not meant to limit the present invention, and the keyswitch label contents can be more or less. After the user selects and triggers the file selecting keyswitch with "Calculator" outputted by the display unit of the plurality of file selecting keyswitch 100, the microprocessor reads the file parsing software 201 saved in the storage module 202 to output the plurality of keyswitch display signals corresponding to a default keyswitch label content file 202a according to the file selecting keyswitch 100a with "Computer," so as to make the keyswitch content output module control the plural display units according to the plural keyswitch display signals to output the display content corresponding to the keyswitch display signals, as shown in FIG. 3, the display contents related to calculator calculating functions appear on only a few keyswitches. When the user needs to return to the last keyswitch display content, the setting keyswitch 101 can be triggered to switch the display content.

After the user completes the selection of the above-mentioned keyswitch display content, the microprocessor instructs the storage module to save the default keyswitch label content file selected by the user from the file list when the keyswitch content output module controls the plurality of display units to output the label content corresponding to the keyswitch display signals according to the plurality of keyswitch display signals. Referring to FIG. 3, take the keyswitch label content file with "Calculating" as the current record, when the user does not operate the electronic label keyboard of the present invention for a long time, for example, the computer host is under the hibernate mode or the shutdown state. Afterwards, if the computer host is restarted, and the microprocessor of the electronic label keyboard of the present invention is activated from the shutdown state or the hibernate mode, the microprocessor can read the file analysis software to analyze the latest read record. That is, analyze the default keyswitch label content file saved in the storage module and outputs a plurality of the keyswitch display signals, so that the keyswitch content output module controls the plurality of display units according to the plurality of keyswitch display signals to output label contents corresponding to the plurality of keyswitch display signals.

It should be noted that, for the embodiments described above in FIG. 2 and FIG. 3, in order to realize that the electronic label keyboard of the present invention can still interact with the computer host after each keyswitch has completed switching the displayed content, the computer host also requires relatively pre-saving the plural of default keyswitch label content files as shown in FIG. 2. In other words, the common identification language between the present invention and the computer host is the keyswitch label content file. Therefore, the electronic label keyboard is triggered by the setting keyswitch 101 and the plurality of file selecting keyswitches 100 to notify the computer host that the function of the keyswitches has been switched, and enable the computer host to recognize the start time for switching and correspondingly read the keyswitch label content file that has been pre-saved in the computer host. And after the computer host reads the keyswitch label content file that can identify the key input signal, it can receive and identify the input signal sent by each keyswitch of the electronic label keyboard of the present invention being triggered, and perform interactive processing.

Figure 4:
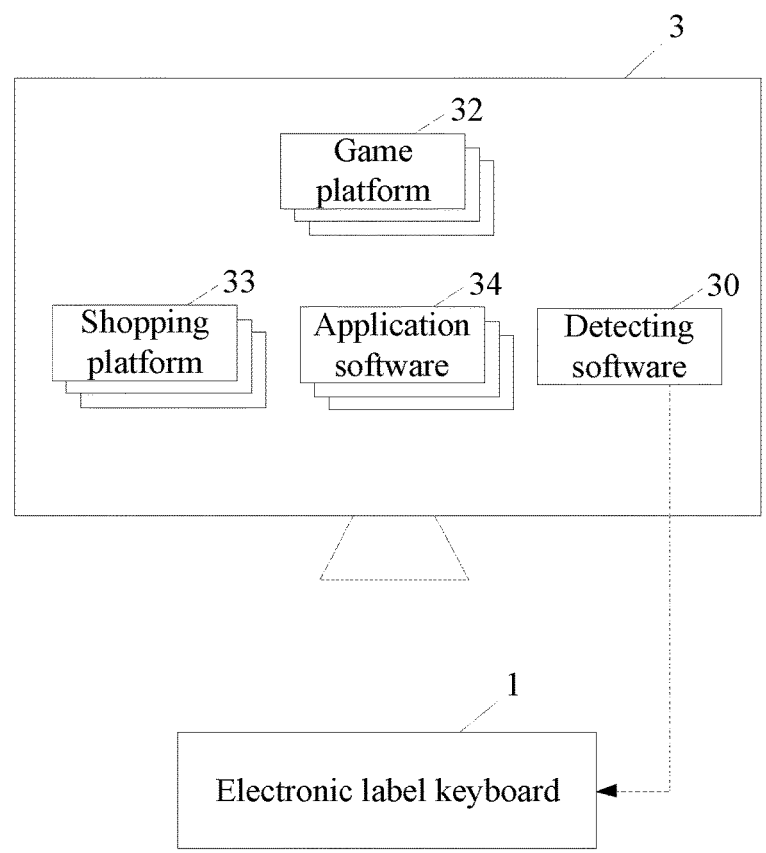
FIG. 4 is a schematic view of the interaction between a computer host and the electronic label keyboard of the third embodiment of the present invention.

Further, referring to FIG. 4, the external device being interacted with the present invention is not limited to the computer host 3 shown in this embodiment, which can also be a tablet computer, a mobile phone or TV with Internet access and other devices that require input devices. The computer host 3 of the present embodiment has a detecting software 30, so that when the user executes different operating systems such as the game platform 32, the shopping platform 33 or the application software 34, etc. on the computer host 3 to switch the display of the computer host to different pages, the label contents of the plurality of keyswitchs are further switched accordingly. In detail, the detecting software 30 identifies the operating system executed by the computer host 3 to identify the identification information of the operating system in execution, and inputs the identification information through the keyswitch content input module of the electronic label keyboard 1. The microprocessor reads the file parsing software saved in the storage module to select the default keyswitch label content file corresponding to the identification information, and the file parsing software outputs a plurality of the keyswitch display signals according to the default keyswitch label content file corresponding to the identification information, so that the keyswitch content output module controls the plurality of display units to output the label content corresponding to the keyswitch display signal according to the plurality of the keyswitch display signals, so as to achieve the switching processing of the label content displayed by the plurality of keyswitches. The computer host 3 executes application software such as word processing, image processing, drawing software, video production or program development, or executes web browsing on web platforms such as shopping platforms or game platforms. Therefore, the users often have special shortcut keys to execute the above-mentioned different operating systems through the computer host 3, and by virtue of the present invention, the shortcut keyswitch settings of different operating systems can be completed quickly or concisely. Especially, among the many keyswitches, only the shortcut keyswitches required by the user to operate the operating system executed by the computer host are displayed, and the shortcut keyswitches can be automatically switched and displayed according to the operating system being executed in time.

Figure 5:
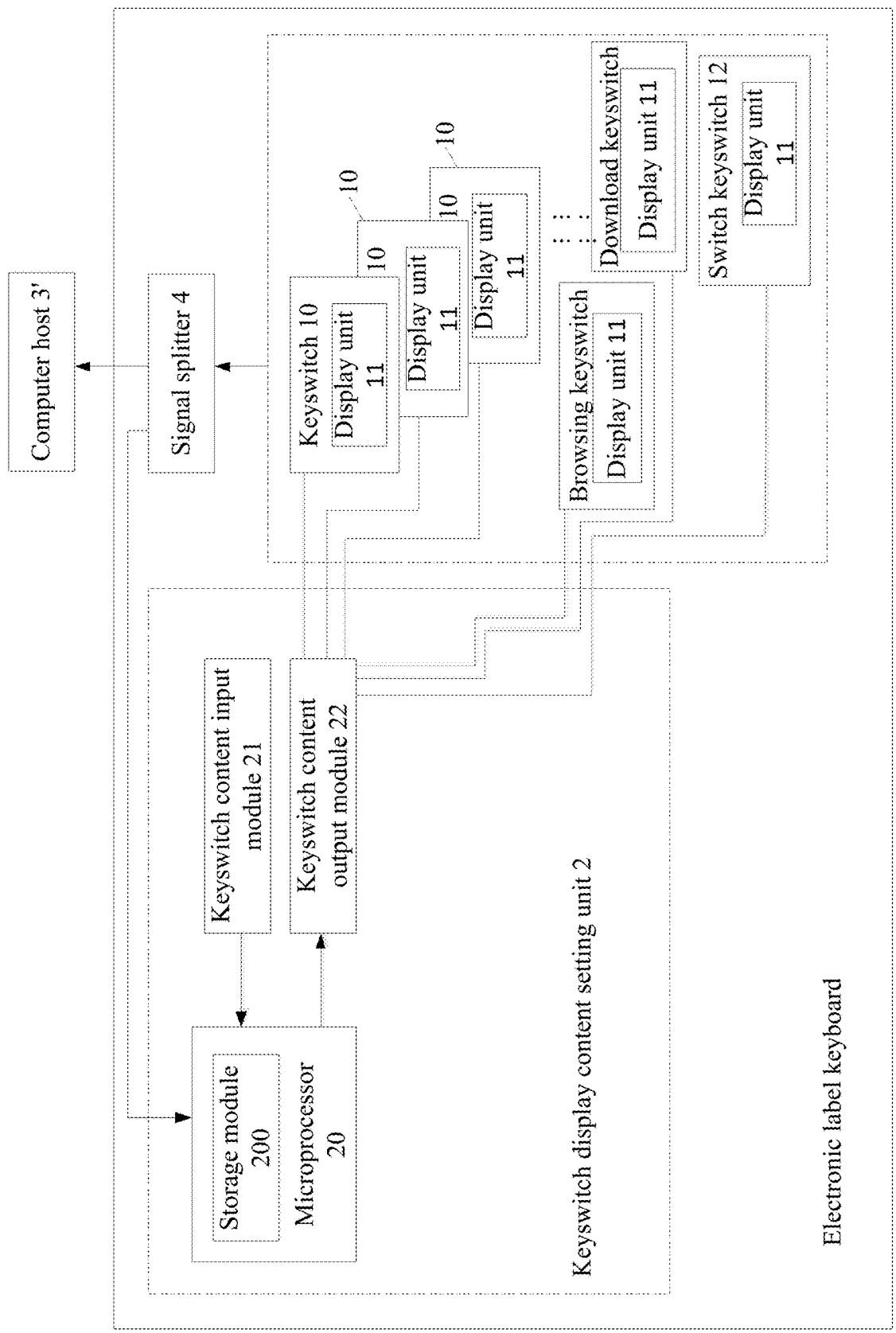
FIG. 5 is a block diagram of the basic system structure of the fourth embodiment of the electronic label keyboard of the present invention.
Figure 6A:
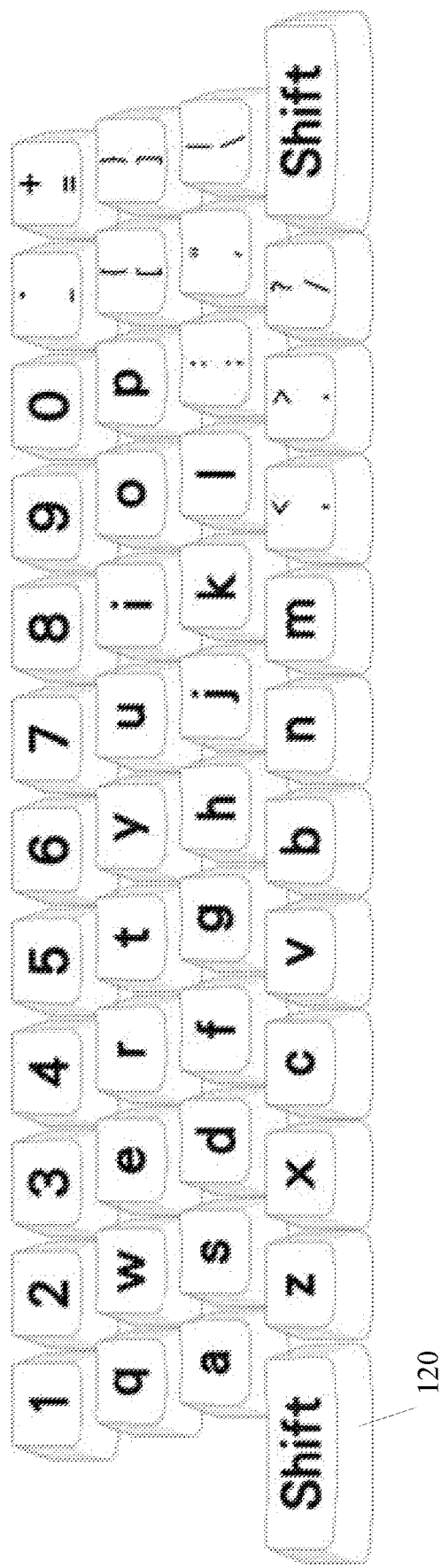
FIG. 6A and FIG. 6B are respectively examples of the electronic label keyboard of the present invention providing lowercase English letters and the electronic label keyboard of the present invention providing uppercase English letters.
Figure 6B:
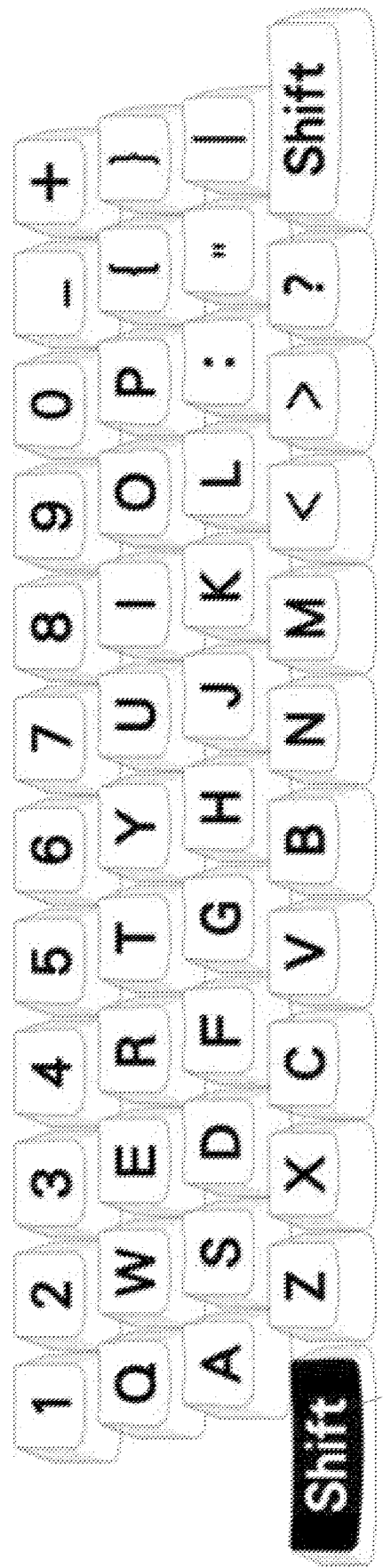

Moreover, referring to FIG. 5, the difference from FIG. 1 above is that: the embodiment further includes a signal splitter 4 connected with each of the plurality of keyswitches 10 and the microprocessor 20 and with the computer host 3'. One of the plurality of keyswitches 10 has a switch keyswitch 12, and the switch keyswitch 12 is used for the user to input a keyswitch display content switch signal. After the signal splitter 4 receives the keyswitch display content switch signal, the microprocessor 20 reads and parses the keyswitch label content file corresponding to the keyswitch display content switch signal saved in the storage module 200 to output a plurality of keyswitch display signals, so that, the keyswitch content output module controls the plurality of display units 11 to output the label content corresponding to the keyswitch display content switch signal according to the plurality of keyswitch display signals. On the other hand, the signal splitter 4 notifies the computer host 3 to execute the corresponding keyswitch display content switching process according to the keyswitch display content switch signal. This embodiment can be applied to switching between uppercase and lowercase English letters, as shown in FIG. 6A and FIG. 6B. FIG. 6A shows the lowercase input of English letters of the embodiment, when the user needs to input English letters in uppercase, the switch keyswitch 120 can be clicked, as shown in FIG. 6A, then the keyswitch display content is converted to uppercase input of English letters as shown in FIG. 6B, and the switch keyswitch 120 stays in a fully illuminated state.

Figure 7A:
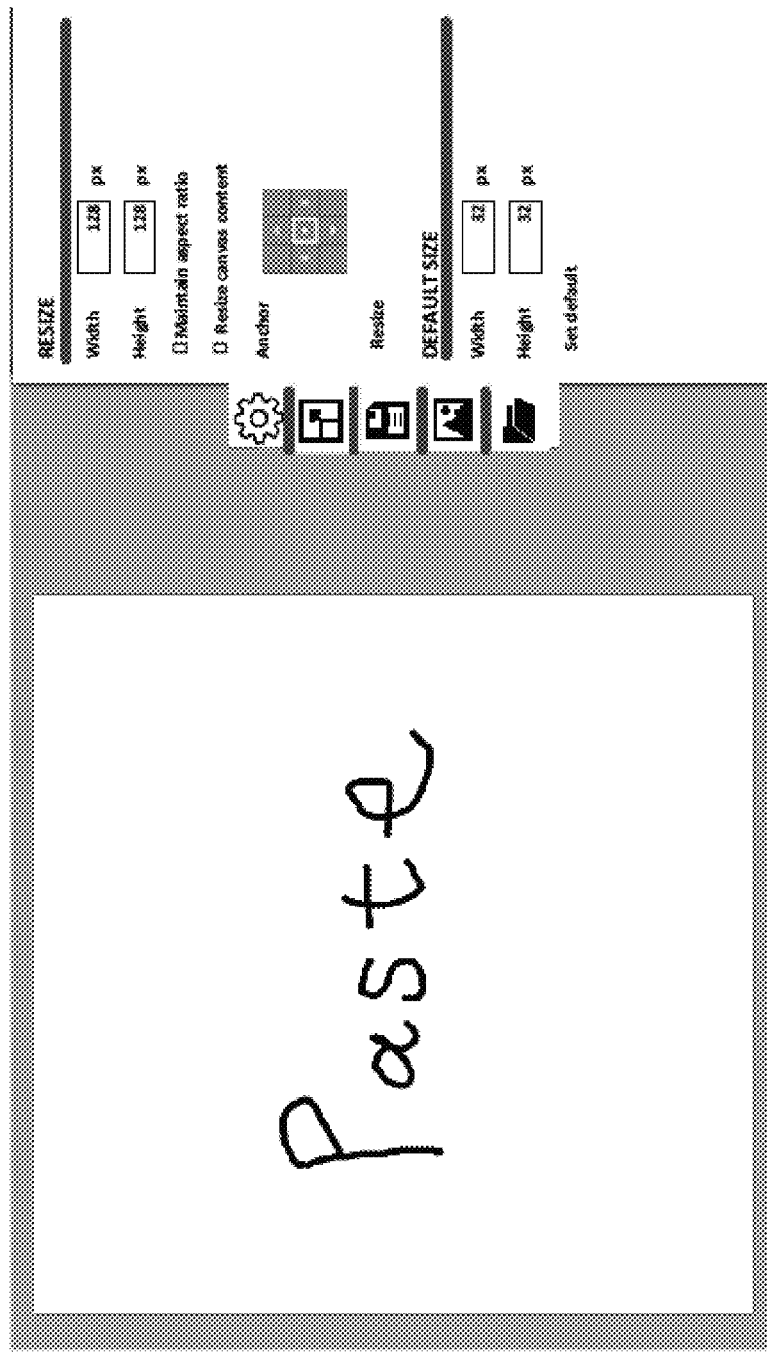
FIG. 7A and FIG. 7B are respectively examples of the keyswitch label content being defined by the user on the computer host to define the design picture of the key label content, and the label content displayed by the keyswitch after the design file is downloaded, saved and read to the keyboard.
Figure 7B:
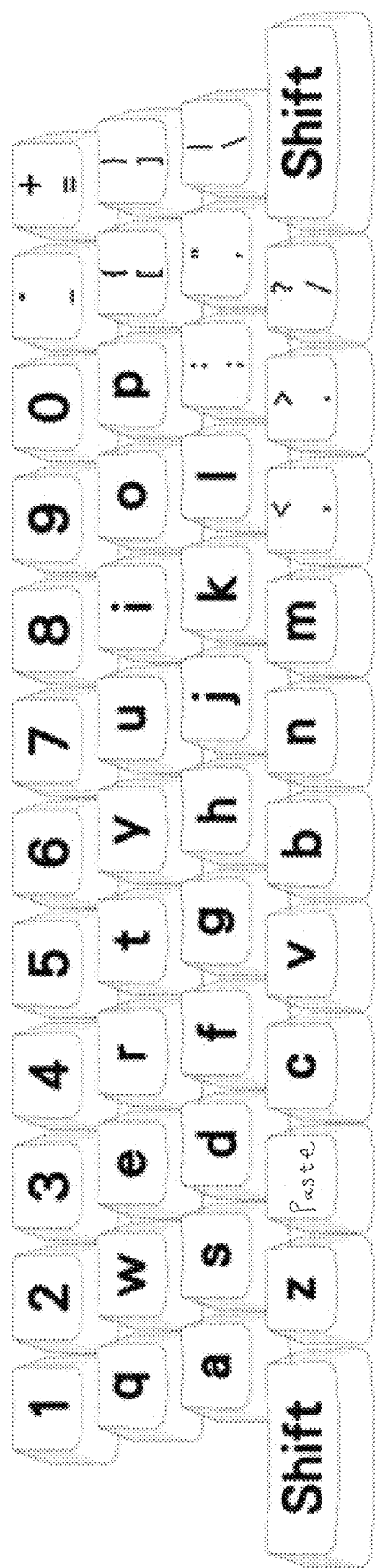

In addition, with the above-mentioned structure of FIG. 5, the plurality of keyswitches 10 further provided with a browsing keyswitch. The browsing keyswitch is used for the user to input keyswitch display content browsing signals. After the signal splitter 4 receives the keyswitch display content browsing signal, the signal splitter 4 notifies the computer host 3, so that the monitor (not shown in the figure) of the computer host 3 provides at least one design preview screen of the keyswitch display content according to the keyswitch display content browsing signal, as shown in FIG. 7A, which provides the user to design and browse the keyswitch content to be displayed, and after the design is completed, a keyswitch label content file is generated for the electronic label keyboard of the present invention to download and save for reading by the microprocessor subsequently. Correspondingly, the plurality of keyswitches 10 have a download keyswitch for the user to input a keyswitch display content download signal, and the signal splitter 4 receives the keyswitch display content download signal, the signal splitter 4 notifies the computer host 3, so that the computer host 3 downloads the keyswitch label content file completed by the user's design to the storage module 200 for storage according to the keyswitch display content download signal. The microprocessor 20 reads the file parsing software to parse the keyswitch label content file saved in the storage module 200 and outputs a plurality of the keyswitch display signals and enables the keyswitch content output module to control the plurality of display units to output the label content corresponding to the keyswitch display signals according to the plurality of keyswitch display signals, as shown in FIG. 7B. Therefore, the keyswitch label content of the electronic label keyboard of the present invention is not only automatically updated by the keyswitch label content file provided by the computer host or an external device such as a memory card, but also can be designed and defined by the user through the computer host.

It can be observed by the above structure of FIG. 5, the electronic label keyboard of the present invention can preset one or more specific keyswitches in the plurality of keyswitches of the electronic label keyboard of the present invention, such as the above-mentioned switch keyswitch, browsing keyswitch and download keyswitch, etc. The specific keyswitch can be used as a confirmation means of handshaking between the electronic label keyboard of the present invention and the computer host before changing the display content of the keyswitch and changing the function of the keyswitch. Thereby, when the user activates the reading of the keyswitch label content file, the switching of the key label content and the change of the keyswitch function on the electronic label keyboard of the present invention, the computer host at the other site can also recognize the keyswitch signal represented by the keyswitch after the label content is switched.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims

What is claimed is:

1. An electronic label keyboard, wired or wireless connected to computer host, comprising:
    a plurality of keyswitches, wherein each keyswitch of the plurality of keyswitches has a content area respectively;
    a plurality of display units, respectively disposed on the content areas of the keyswitches, at least one of the plurality of display units outputting according to a keyswitch display signal, so that the at least one display unit located on the at least one of the plurality of keyswitches displays a marked content; and
    a keyswitch display content setting unit, including:
        a microprocessor having a storage module for saving file parsing software;
        a keyswitch content input module for receiving and reading at least one keyswitch label content file provided by the computer host, and saving the at least one keyswitch label content file in the storage module of the microprocessor; and
        a computer programed to function as a keyswitch content output module, wherein when the microprocessor is activated from a shutdown mode or a hibernate mode, the microprocessor reads file analysis software to analyze the keyswitch label content file saved in the storage module and outputs a plurality of the keyswitch display signals, so that the computer programed to function as the keyswitch content output module controls the plurality of display units according to the plurality of keyswitch display signals to output label contents corresponding to the plurality of keyswitch display signals, wherein the electronic label keyboard further includes a signal splitter connected with each of the plurality of keyswitches and the microprocessor and with the computer host, wherein one of the plurality of keyswitches has a switch keyswitch, and the switch keyswitch is used for a user to input a keyswitch display content switch signal, after the signal splitter receives the keyswitch display content switch signal, the microprocessor reads and parses the keyswitch label content file corresponding to the keyswitch display content switch signal saved in the storage module to output the plurality of the keyswitch display signals, so that, the computer programed to function as the keyswitch content output module controls the plurality of display units to output the label contents corresponding to the keyswitch display content switch signal according to the plurality of the keyswitch display signals, and the signal splitter notifies the computer host to execute a corresponding keyswitch display content switching process according to the keyswitch display content switch signal;

wherein the plurality of keyswitches are further provided with a browsing keyswitch, the browsing keyswitch is used for the user to input keyswitch display content browsing signals, after the signal splitter receives the keyswitch display content browsing signals, the signal splitter notifies the computer host, so that a monitor of the computer host provides at least one design preview screen of a keyswitch display content according to the keyswitch display content browsing signals, which provides the user to design and browse the keyswitch display content to be displayed, and after the design is completed, the keyswitch label content file is generated;

wherein the plurality of keyswitches have a download keyswitch for the user to input a keyswitch display content download signal, and the signal splitter receives the keyswitch display content download signal, the signal splitter notifies the computer host, so that the computer host downloads the keyswitch label content file completed by the user's design to the storage module for storage according to the keyswitch display content download signal;

wherein at least one of the switch keyswitch, the browsing keyswitch and the download keyswitch is preset as a specific keyswitch to be used as a confirmation means of handshaking between the electronic label keyboard and the computer host before changing a display content of the specific keyswitch and changing a function of the specific keyswitch; thereby, when the user activates reading of the keyswitch label content file, switching of a key label content and changing of a keyswitch function on the electronic label keyboard, the computer host recognizes a keyswitch signal represented by the specific keyswitch after the key label content is switched.

2. The electronic label keyboard according to claim 1, wherein the at least one of the plurality of display units is electronic paper (E-paper), liquid crystal display (LCD), Mini light emitting diode (LED) or Micro LED.

3. The electronic label keyboard according to claim 1, wherein the keyswitch content input module is a universal serial bus (USB) interface, a Personal System/2 (PS/2) interface, or a wired connection interface of a memory slot.

4. The electronic label keyboard according to claim 1, wherein the storage module of the electronic label keyboard saves a file list having a plurality of keyswitch label content files and a list reading software, and the plurality of keyswitches have a plurality of file selecting keyswitches and a setting keyswitch, when the setting keyswitch is triggered, the microprocessor reads the list reading software saved in the storage module to output a plurality of file selecting signals according to the file list, and allows the computer programed to function as the keyswitch content output module to control a display unit disposed on the content area of each of the plurality of file selecting keyswitches according to the plurality of file selecting signals to output keyswitch display content setting names corresponding to each of the plurality of file selection signals, and a keyswitch display content setting name is set for the user to view and conveniently select a keyswitch label content, after the user selects and triggers a file selecting keyswitch of the plurality of file selecting keyswitches, the microprocessor reads the file parsing software saved in the storage module to output the plurality of keyswitch display signals corresponding to a default keyswitch label content file according to the selected file selecting keyswitch, so as to make the computer programed to function as the keyswitch content output module control the plurality of display units according to the plurality of the keyswitch display signals to output display content corresponding to the plurality of the keyswitch display signals.

5. The electronic label keyboard according to claim 4, wherein the microprocessor instructs the storage module to save the default keyswitch label content file selected by the user from the file list when the computer programed to function as the keyswitch content output module controls the plurality of display units to output the label contents corresponding to the plurality of the keyswitch display signals according to the plurality of keyswitch display signals, when the microprocessor is activated from the shutdown mode or the hibernate mode, the microprocessor reads the file analysis software to analyze the default keyswitch label content file saved in the storage module and outputs the plurality of the keyswitch display signals, so that the computer programed to function as the keyswitch content output module controls the plurality of display units according to the plurality of keyswitch display signals to output the label contents corresponding to the plurality of keyswitch display signals.

6. The electronic label keyboard according to claim 4, wherein the computer host has a detecting software, so that when the user executes different operating systems on the computer host to switch a display of the computer host to different pages, the label contents of the plurality of keyswitches are further switched accordingly, wherein the detecting software identifies an operating system executed by the computer host to identify identification information of the operating system in execution, and inputs the identification information through the keyswitch content input module of the electronic label keyboard, and the microprocessor reads the file parsing software saved in the storage module to select the default keyswitch label content file corresponding to the identification information, and the file parsing software outputs a plurality of the keyswitch display signals according to the default keyswitch label content file corresponding to the identification information, so that the computer programed to function as the keyswitch content output module controls the plurality of display units to output the label contents corresponding to the plurality of the keyswitch display signals according to the plurality of the keyswitch display signals, so as to achieve switching processing of the label contents displayed by the plurality of keyswitches.

7. The electronic label keyboard according to claim 1, wherein the keyswitch content input module is a wireless connection interface using Bluetooth communication to receive the keyswitch label content file provided by the computer host through the wireless connection interface.

8. The electronic label keyboard according to claim 1, wherein the keyswitch label content file provided by the computer host is downloaded from at least one game platform, at least one shopping platform or at least one application software provider platform for the user to download and save in the storage module.

\* \* \* \* \*